Figure 1:
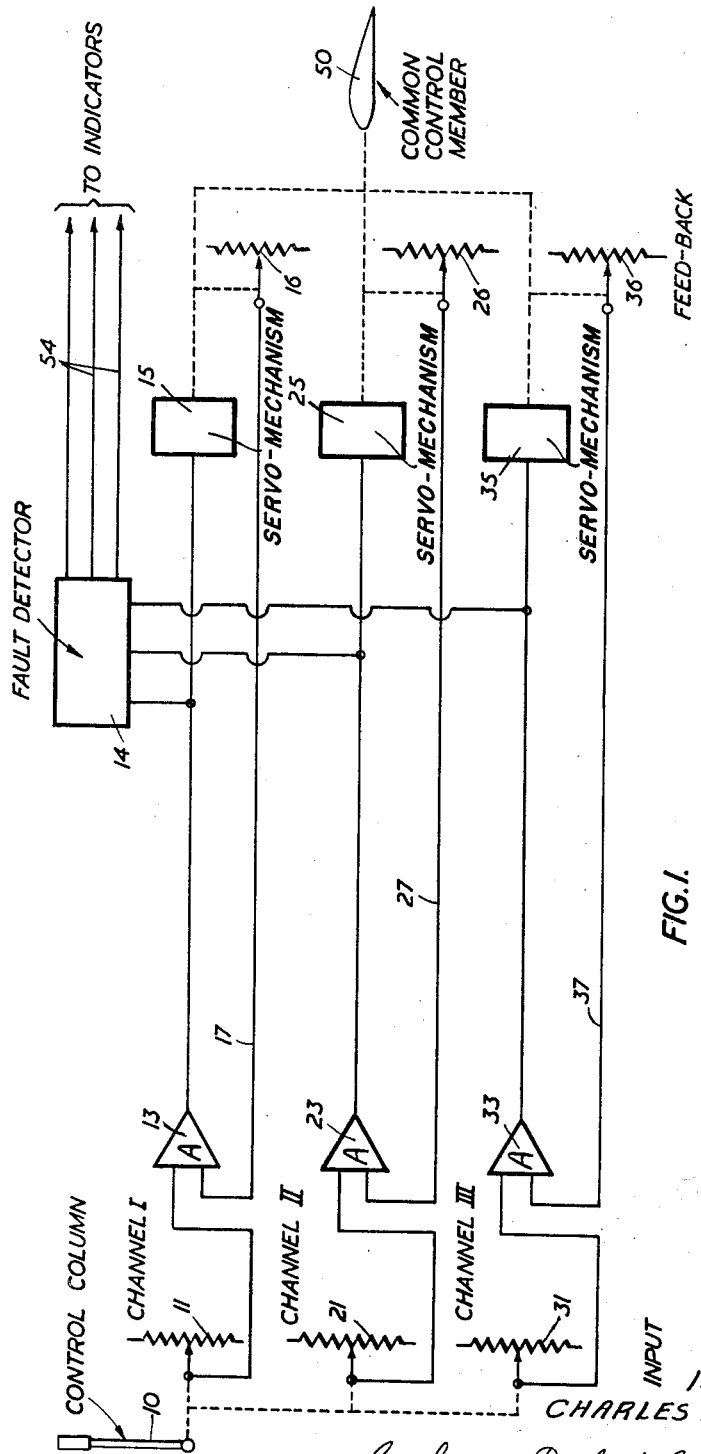

July 2, 1963

C. B. FLINDT 3,095,783

FAULT DETECTION MEANS

Filed May 2, 1960

3 Sheets-Sheet 1

INVENTOR
CHARLES B. FLINDT
BY Cushman, Darby & Cushman
ATTORNEYS

United States Patent Office 3,095,783
Patented July 2, 1963

3,095,783
FAULT DETECTION MEANS
Charles B. Flindt, Sunbury-on-Thames, England, assignor to Short Brothers & Harland Limited, Belfast, Northern Ireland, a British company
Filed May 2, 1960, Ser. No. 25,954
12 Claims. (Cl. 91—1)

The invention is concerned with a power-operated apparatus for controlling the operation of an organ such as an aircraft control surface, of the type comprising three independent servo control systems connected between the pilot's control column (or its equivalent) and a common output member operatively connected to the organ to be controlled, in such arrangement that the effect of a fault in any one of the systems on the operation of a control surface or the like can be overcome by the remaining two serviceable channels. The object of the invention is to provide in a system of the kind described means by which a fault in the transmission of a signal to the controlled organ may be identified with the appropriate channel.

According to the present invention, there is provided apparatus for controlling the movement of an organ such as an aircraft control surface or the like in response to input control means, comprising at least three independent servo control systems, each having an independent servo motor with its output mechanically coupled to a common output member controlling movement of said organ and each having an independent electrical signal transmission channel adapted to be supplied with electrical input control signals representative of the movement of the said input control means, means for sampling the electrical control signal in each electrical signal channel and for comparing each sample with each of two other electrical signal samples, and warning means responsive to any disparity between the compared samples to indicate the identity of a defective channel.

According to a preferred feature, each channel includes an amplifier, and a feed-back circuit 17, the input of which is controlled by and is proportionate to the movement of the organ to be controlled, and the output of the feed-back circuit is supplied to the amplifier.

According to another feature of the invention the sampling means is connected to the output of the amplifier of each channel, and a further feed-back circuit is included together with means for supplying an input thereto which is proportional to the demanded rate of the controlling movement of the common output member, and the output of this further feed-back circuit is supplied to the input of the amplifier in a direction which tends to cancel the output therefrom. In this preferred embodiment, a disparity between the sample signals from the channels occurs if one channel is defective and/or if the rate of movement demanded by the outputs of one channel differs from the other two.

The signals in the channels may be sampled and compared with one another by three relays each comprising one or more pairs of opposed windings arranged when an electrical unbalance exists between them to actuate two switches, the first of which is adapted to connect with a warning circuit, whilst the second switch is adapted to connect a power supply with the first switch of one of the other relays. The windings of each relay respectively are adapted to sample the signals in two of the channels, the signal in each channel being sampled by windings in different relays. The signals from two channels are thus sampled in each relay, which is adapted to be electrically unbalanced when a disparity exists between the two signal samples, thereby actuating the two switches. However, although a faulty channel results in the actuation of two relays, only one warning circuit is completed, and this may be identified with the faulty channel.

In order that the invention may be more readily understood reference will be made to the accompanying drawings which illustrate by way of example preferred embodiments thereof.

Figure 2:
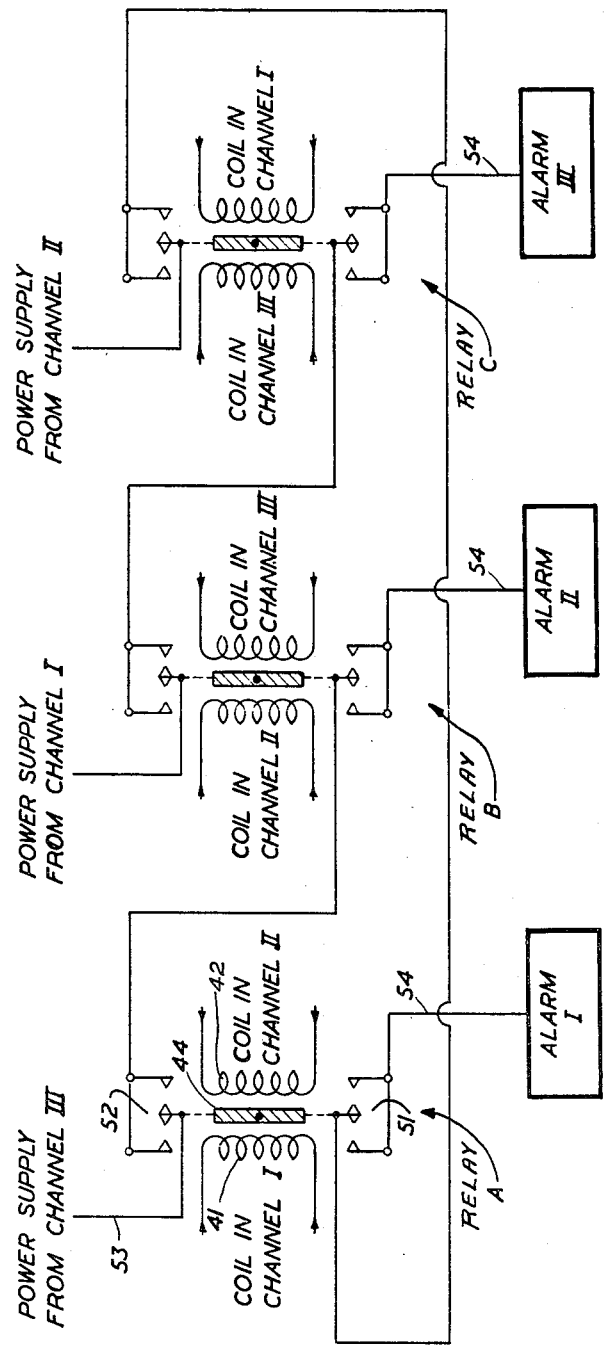
Figure 3:
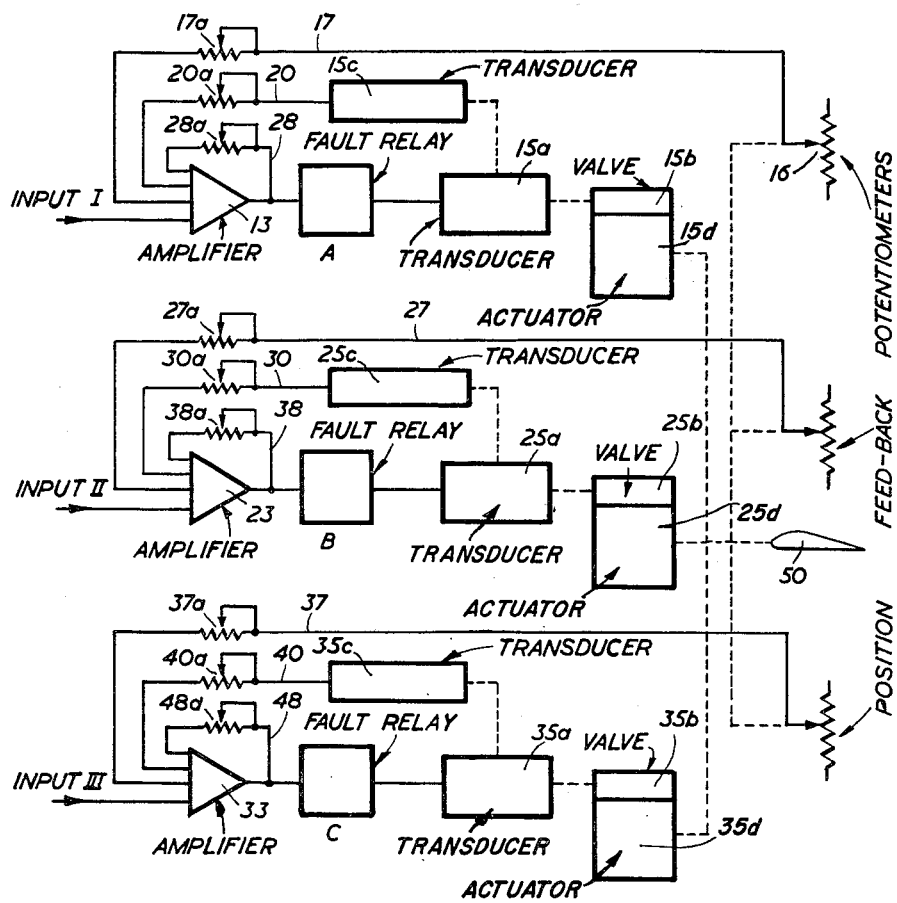

In the drawings:
FIG. 1 is a block diagram of an embodiment applied to a power-assisted aircraft control system.
FIG. 2 is a diagram of the fault detector circuits employed in the system illustrated in FIG. 1 and
FIG. 3 is a block diagram of a preferred embodiment in which a feed-back circuit is provided in each channel.

In the drawings electrical connections are indicated by continuous lines and mechanical connections are indicated by dashed lines.

In FIG. 1 a control column 10 is mechanically connected to the pick-off arms of three ganged rheostats 11, 21 and 31, so that a given movement of the control column produces the same input from a signal source not shown, to each of the three channels I, II and III which respectively include amplifiers 13, 23 and 33. A fault detector 14 is arranged to sample the amplifier output in each of the three channels and is connected to indicators respectively associated with each channel. The outputs from the channels are received respectively by servomechanisms 15, 25 and 35 which each comprise an input transducer of the mechanical to electrical signal type such as transducer 15a in FIGURE 3, a hydraulic valve 15b, and a hydraulic actuator 15d. The input transducer drives the spindle of the respective valve in response to the output from the associated amplifier, and the valve in turn controls the flow of hydraulic fluid to the actuator. The arrangement is such that if a fault develops in any one of the channels, its effect on the control surface is overcome by the output from the remaining two serviceable channels. The control surface is mechanically connected to the pick-off arms of three further ganged rheostats 16, 26 and 36 which are arranged to deliver a signal, the magnitude of which is proportional to the movement of the control surface, through respective feed-back circuits 17, 27 and 37 to the inputs of the respective amplifiers.

FIG. 2 shows in more detail the fault detector 14 which comprises three relays A, B and C which are similar and each of which comprises a pair of opposed coils 41, 42, and insulated armature 44 mounted on pivots between the coils, warning switch 51 and a supply switch 52, the movable contacts of these switches respectively being attached to the ends of the armature. The movable contact of each warning switch 51 is connected to the fixed contacts of the supply switch of one of the other relays, and the movable contact of each supply switch 52 is connected through lead 53 to a source of power supply which is not shown, but which may be conveniently tapped from the channel which is not sampled by the relay. The fixed contacts of each warning switch 51 are connected via a line 54 to a respective warning or alarm circuit which may be, for example, a lamp, not shown. Each channel is arranged to be sampled by two coils in different relays, thus channel I is sampled by coil 41 in relay A and by the coil in relay C corresponding to coil 42, channel II by coil 42 in relay A and the coil corresponding to coil 41 in relay B, and channel III by the coil in relay B corresponding to coil 42 and the coil in relay C corresponding to the coil 41.

If a fault develops, for example in channel I, the consequent disparity in the signals sampled from this channel actuates relays A and C and closes the switches in these relays. The warning switch in relay A and the supply switch in relay C being closed, the warning circuit associated with channel I is energised, and indicates the existence of a fault in channel I. The warning circuit associated with channel III is not energised, however, since the necessary power supply is obtained from the supply switch of relay B which is not actuated. Corresponding considerations apply for a fault in any one of the channels.

In the arrangement shown in FIG. 3 a feed-back circuit for each channel is arranged to deliver an output to its amplifier which is proportional to the displacement of the spindle of a hydraulic valve actuated by the output from the amplifier. The outputs from the respective channels are received by input transducers 15a, 25a and 35a which respectively operate the spindles of valves 15b, 25b and 35b controlling hydraulic actuators 15d, 25d, and 35d, which effect movement of the control surface 50. The spindles are mechanically connected respectively to output transducers 15c, 25c and 35c which feed valve position signals through feed-back circuits 20, 30 and 40 into the input of the amplifiers associated with the channels, in such a way that the valve movement tends to cancel the amplifier output calling for that movement. Rheostats 20a, 30a and 40a in these feed-back circuits enable the magnitude of the signals to be controlled. In addition to these feed-back circuits, other such circuits 17, 27 and 37 already described are provided with a rheostat 17a, 27a and 37a. A third series of feed-back circuits 28, 38 and 48 are also provided respectively with rheostats 28a, 38a and 48a for permitting adjustments to be made.

Since the fault detector relays A, B and C compare the net outputs from the respective amplifiers and since the signals in each channel include respectively a component from the output transducer 15c, 25c and 35c the failure of any one of the input transducers 15a, 25a, and 35a results in a disparity between the sampled signal from the channel associated therewith and the two sampled signals with which it is compared. As a result, the warning circuit associated with the channel connected with the faulty input transducers 15a, 25a, 35a is energised, thereby identifying the faulty input transducer. In such hydraulically operated servo-mechanisms the electrical output from each of the valve positions or output transducers 15c, 25c, and 35c is a measure of the demanded speed of the servo output shaft and therefore serves as a velocity damping signal when it is fed in the correct phase into the associated amplifier, thus tending to stabilise the system.

What I claim as my invention and desire to secure by Letters Patent is:

1. Apparatus for controlling the movement of an organ such as an aircraft control surface or the like in response to input control means, comprising at least three independent servo control systems, each having an independent servo mechanism with its output mechanically coupled to a common output member controlling movement of said organ and each having an independent electrical signal transmission channel adapted to be supplied with electrical input control signals representative of the movement of the said input control means, means for sampling the electrical control signal in each channel and for comparing each electrical signal sample with each of two other electrical signal samples, and warning means responsive to any disparity between the compared samples to indicate the identity of a defective channel.

2. Apparatus according to claim 1 in which each channel includes an amplifier and a feed-back circuit the input of which is adapted to be controlled by and is proportional to the movement of the organ of the aircraft or the like, and the output of which is connected to the amplifier.

3. Apparatus according to claim 2 in which the said sampling means are connected to the output of each amplifier and in which a further feed-back circuit is provided together with means for supplying an input thereto which is proportional to the demanded rate of the controlling movement of said output member, the output of said further feed-back circuit being connected to said amplifier, such that it tends to cancel the amplifier output.

4. Apparatus according to claim 1 wherein said sampling means includes three relays, each relay comprising at least one pair of opposed windings and two switches, the first of which switches is adapted to connect with a warning circuit while the second of which is adapted to connect a power supply with the first switch of one of the other relays, the windings in each relay respectively being adapted to sample the signal in two channels such that each channel is sampled by windings in different relays, the opposed windings in each relay being adapted to operate the switches of said relay when a state of electrical unbalance exists between them due to a defect in one of the channels sampled by the windings of said relay.

5. Apparatus according to claim 1 wherein said servo-mechanism comprises a transducer, a hydraulic valve and a hydraulic actuator, the transducer driving the valve in response to said control signals, and said valve in turn controlling the flow of fluid to the actuator which operates the said organ.

6. Apparatus for the transmission of electrical signals from input control means to an output member for controlling the movement of an organ such as an aircraft control surface or the like, comprising at least three independent servo control systems, each having an independent servo mechanism with its output mechanically coupled to the said output member and each having an independent electrical signal transmission channel adapted to be supplied with electrical input control signals representative of the movement of the said input control means, means for sampling the electrical control signals into the said independent servo mechanisms, a comparison unit having a plurality of switchable comparison elements for applying the sampled signals in different combinations, taken two at a time, to different comparison elements of the unit, each comparison element switching to a predetermined state in response to a predetermined discrepancy between the sampled signals applied thereto, and a warning unit for each channel responsive to the simultaneous switching of the two comparison elements fed with the sampled signal from the channel with which the warning unit is to be associated to indicate that the channel is defective.

7. Apparatus according to claim 6 in which each channel includes an amplifier and each servo-mechanism has coupled to it a respective feed-back circuit the input of which is adapted to be controlled by and is proportional to the movement of said organ, and the output of which is connected to the respective amplifier.

8. Apparatus according to claim 7 in which the sampling means are connected to the output of each amplifier and in which a further feed-back circuit is provided together with means for supplying an input thereto which is proportional to the demanded rate of the controlling movement of said output member, the output of said further feed-back circuit being connected to said amplifier, such that it tends to cancel the amplifier output.

9. Apparatus according to claim 8 wherein said servo-mechanism comprises a transducer, a hydraulic valve and a hydraulic actuator, the transducer driving the valve in response to said control signals, and said valve in turn controlling the flow of fluid to the actuator which operates the said organ.

10. Apparatus according to claim 9 in which the input of said further feed-back circuit is supplied from the output of a further transducer and in which the said control valve is adapted to apply the mechanical input of said further transducer to produce an electrical feedback signal.

11. Apparatus according to claim 6, wherein the comparison unit comprises three comparison elements, each comparison element being constituted by a relay having at least one pair of opposed windings and two switches, one of the switches being adapted to connect with a warning unit while the other switch is adapted to connect a power supply with the first switch of one of the other relays, the windings in each relay respectively being adapted to sample the signal in two channels such that each channel is sampled by windings in different relays, the windings in each relay being poled and arranged to operate the switches of said relay when their states of energization become unbalanced due to a defect in one of the channels sampled by the windings of said relay.

12. A system for operating an aircraft control system comprising servo mechanisms for actuating a single control surface; a plurality of control circuits for actuating said servo mechanisms; means for detecting a fault in one of said control circuits; and warning means to indicate the location of the fault, wherein said detecting means includes means for sampling the signals in said control circuits in different combinations, taken two at a time, and means for directing a power signal to said warning means upon the detection of a fault in one of said circuits.

References Cited in the file of this patent

UNITED STATES PATENTS

| | | |
|---|---|---|
| 2,232,896 | Wilson | Feb. 25, 1941 |
| 2,769,603 | McDonnell | Nov. 6, 1956 |
| 2,894,491 | Hecht | July 14, 1959 |
| 2,898,889 | Foster | Aug. 11, 1959 |